United States Patent [19]

Ditzig et al.

[11] Patent Number: 5,173,936
[45] Date of Patent: Dec. 22, 1992

[54] TELEPHONE HANDSET HOLDER ASSEMBLY

[75] Inventors: Albert Ditzig, Hoffman Estates; Jerome L. Oldani, Aurora, both of Ill.

[73] Assignee: The Goeken Group Corporation, Oakbrook Terrace, Ill.

[21] Appl. No.: 558,625

[22] Filed: Jul. 27, 1999

Related U.S. Application Data

[63] Continuation-in-part of Ser. No. 520,414, May 8, 1990.

[51] Int. Cl.$^5$ .............................................. H04M 1/00
[52] U.S. Cl. ....................................... 379/440; 379/370; 379/419; 379/428; 379/433; D14/138; D14/147; D14/148; D14/240
[58] Field of Search ....................... 379/53, 58, 61, 62, 379/63, 91, 96, 110, 143, 144, 370, 419, 428, 433, 440, 453, 455; D14/138, 144, 147, 148, 240, 251

[56] References Cited

U.S. PATENT DOCUMENTS

| | | | |
|---|---|---|---|
| D. 276,723 | 12/1984 | Marshall | D14/147 |
| D. 280,986 | 10/1985 | Kao | D14/147 |
| D. 297,837 | 9/1988 | Shibuya et al. | D14/240 |
| D. 299,136 | 12/1988 | Taylor | D14/148 |
| D. 299,137 | 12/1988 | Soren et al. | D14/148 |
| D. 301,034 | 5/1989 | Fujira et al. | D14/138 |
| 4,117,276 | 9/1978 | Zurawski | 379/433 |
| 4,488,009 | 12/1984 | Sherman | 379/370 |
| 4,587,379 | 5/1981 | Masuda | 379/91 |
| 4,661,659 | 4/1987 | Nishimura | 379/61 |
| 4,672,661 | 6/1987 | Clark, Jr. et al. | 379/144 |
| 4,727,569 | 2/1988 | Kutrieb et al. | 379/58 |
| 4,788,420 | 11/1988 | Chang et al. | 379/91 |
| 4,811,387 | 3/1989 | Hollewed et al. | 379/144 |
| 4,868,862 | 9/1989 | Ryoichi et al. | 379/58 |
| 4,881,254 | 11/1989 | Hollewed et al. | 379/144 |
| 4,965,824 | 10/1990 | Hollewed et al. | 379/428 |
| 4,977,592 | 12/1990 | Hollewed et al. | 379/428 |

FOREIGN PATENT DOCUMENTS

0808594 7/1951 Fed. Rep. of Germany ...... 379/440

OTHER PUBLICATIONS

STC Telecommunications Limited, Back Cover of British Telecommunications Engineering, vol. 3, Jul. 1984.
NEC America Incorporated, May 5, 1986.
Gizmo, "Taking It All on the Road", Popular Electronics, Jul. 1991 p. 10.

Primary Examiner—James L. Dwyer
Assistant Examiner—William Cumming
Attorney, Agent, or Firm—Jeffrey M. Morris

[57] ABSTRACT

A convenient versatile telephone handset and holder assembly are provided, which are particularly useful for business travelers in airplanes, trains, ships, and buses to link up to reservation systems and other data bases. The telephone handset preferably has one set of telephone activating keys and another set of computer control keys. The special telephone handset can also have a card-receiving slot and a recessed mouthpiece. The handset holder assembly has a sloping bottom portion and an elastomeric biasing member to facilitate quick removal fo the telephone handset. An overhead lock assembly can be provided to engage the credit card-receiving slot of the telephone handset in order to secure the handset when the handset is stored in the holder. A special reversible mount plate and bracket can also be provided to quickly and securely mount the handset to the left, right, or other portions of a chair, bulkhead, or other surface.

18 Claims, 7 Drawing Sheets

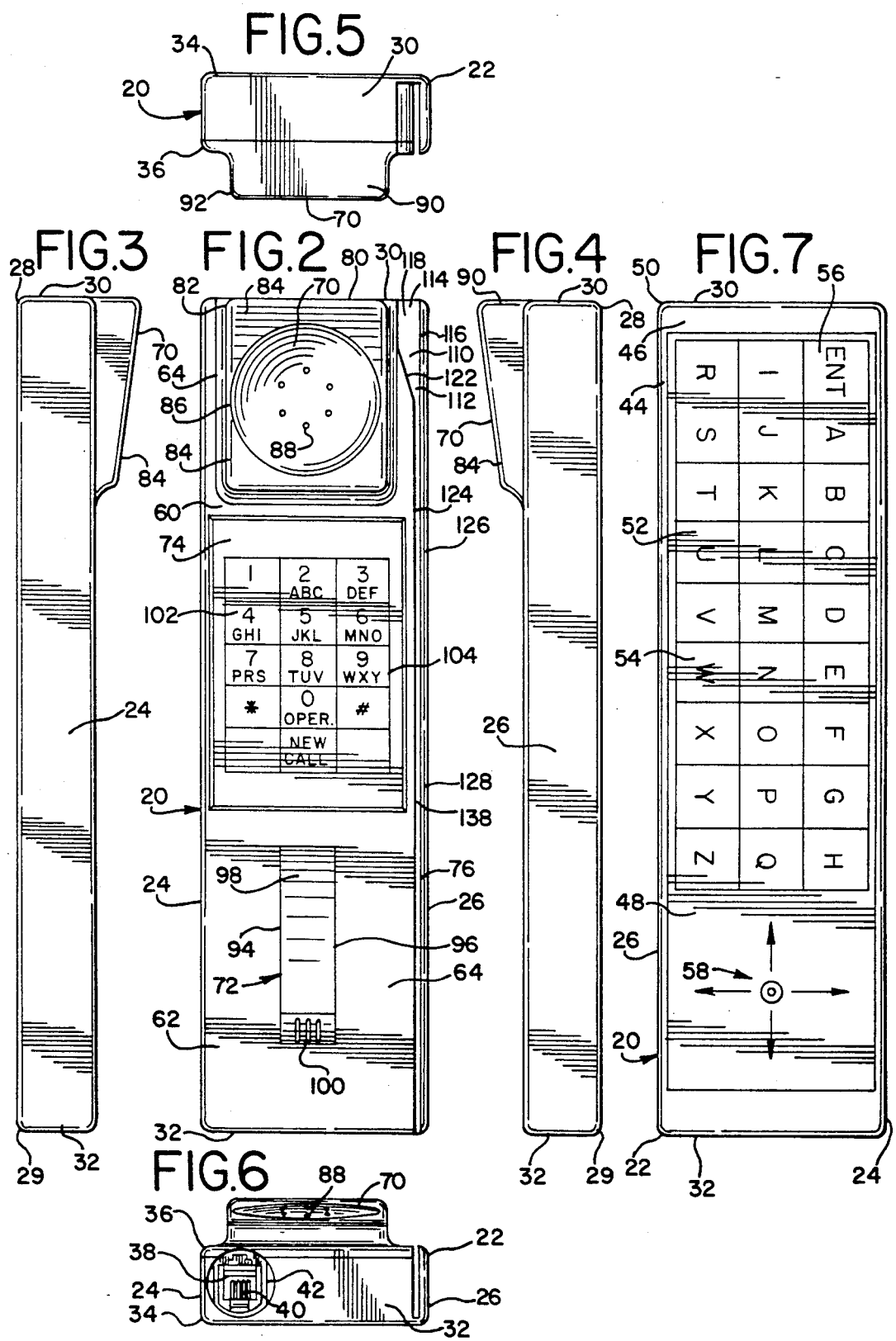

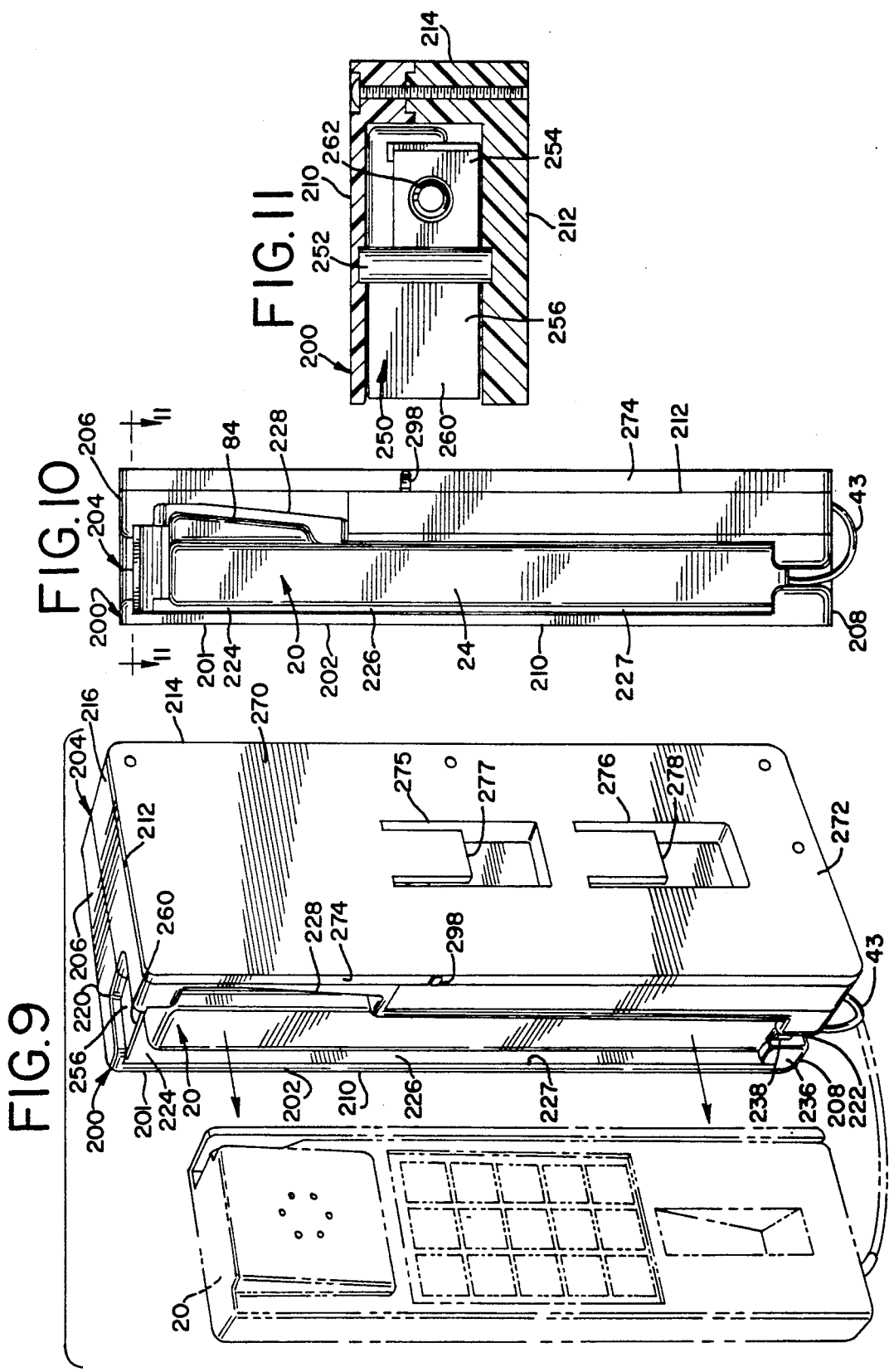

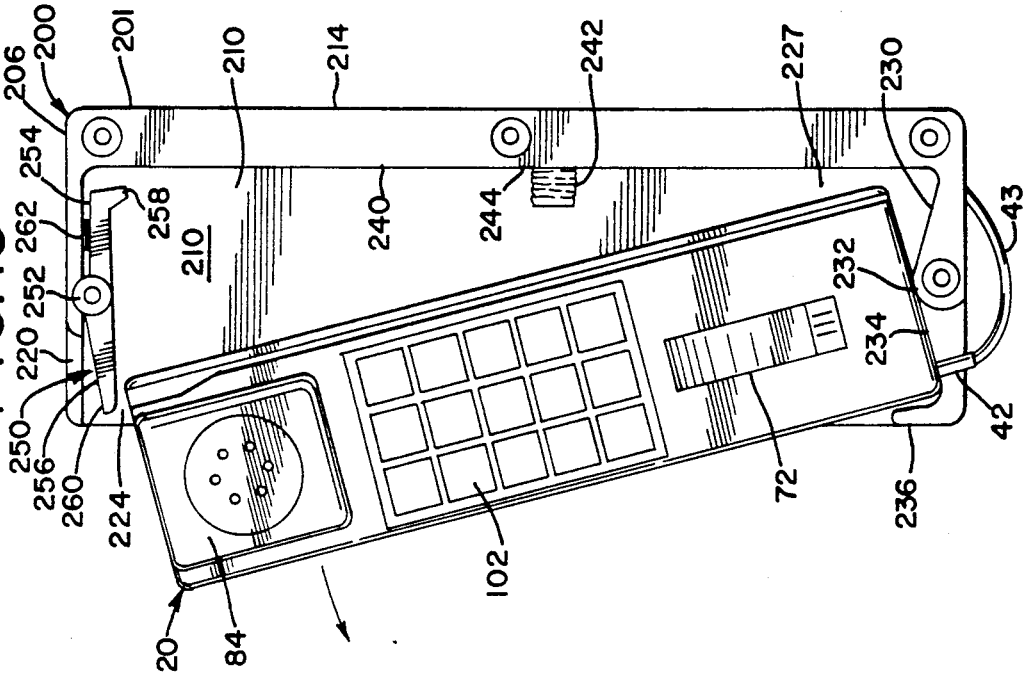
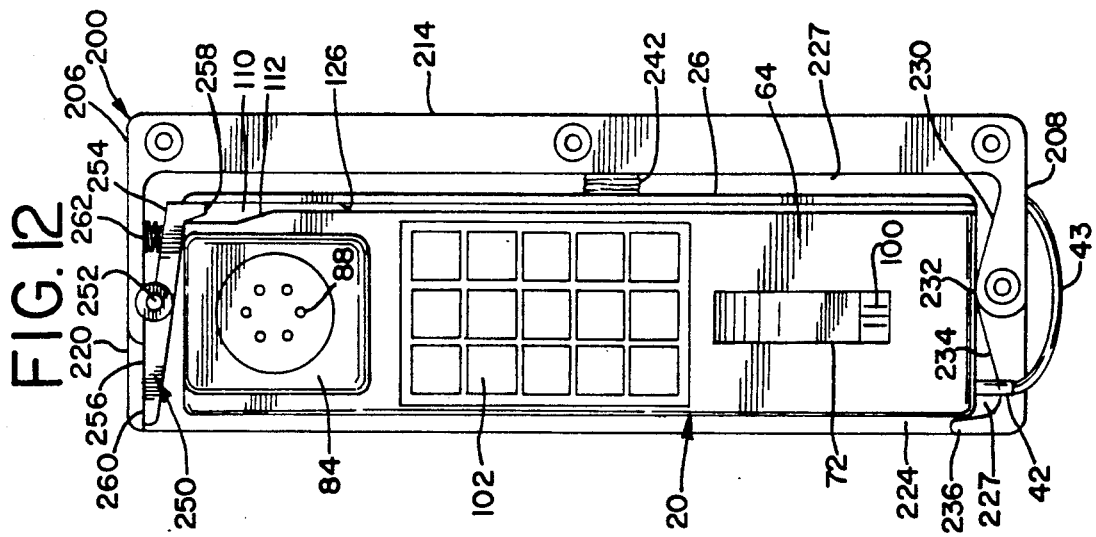

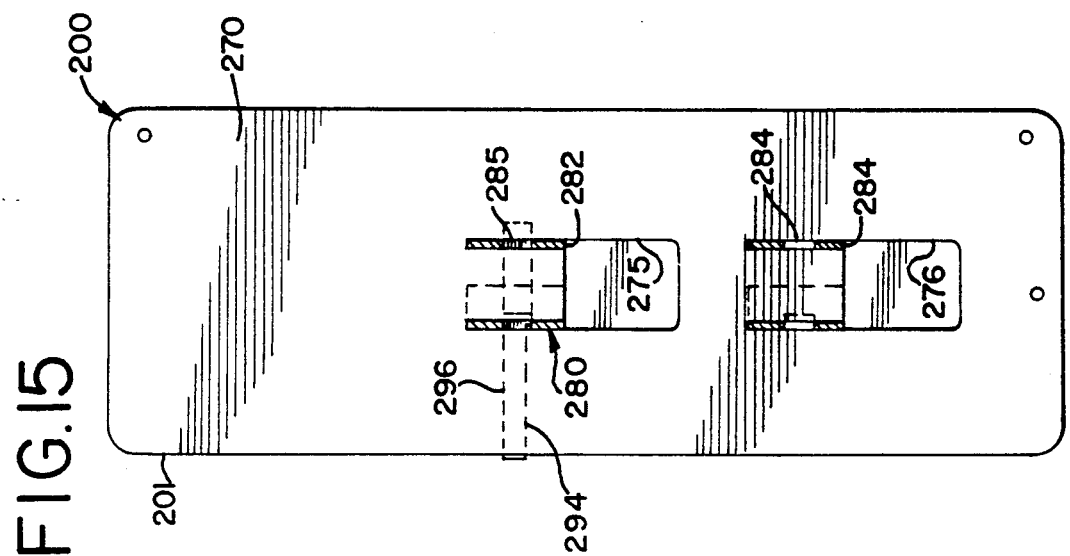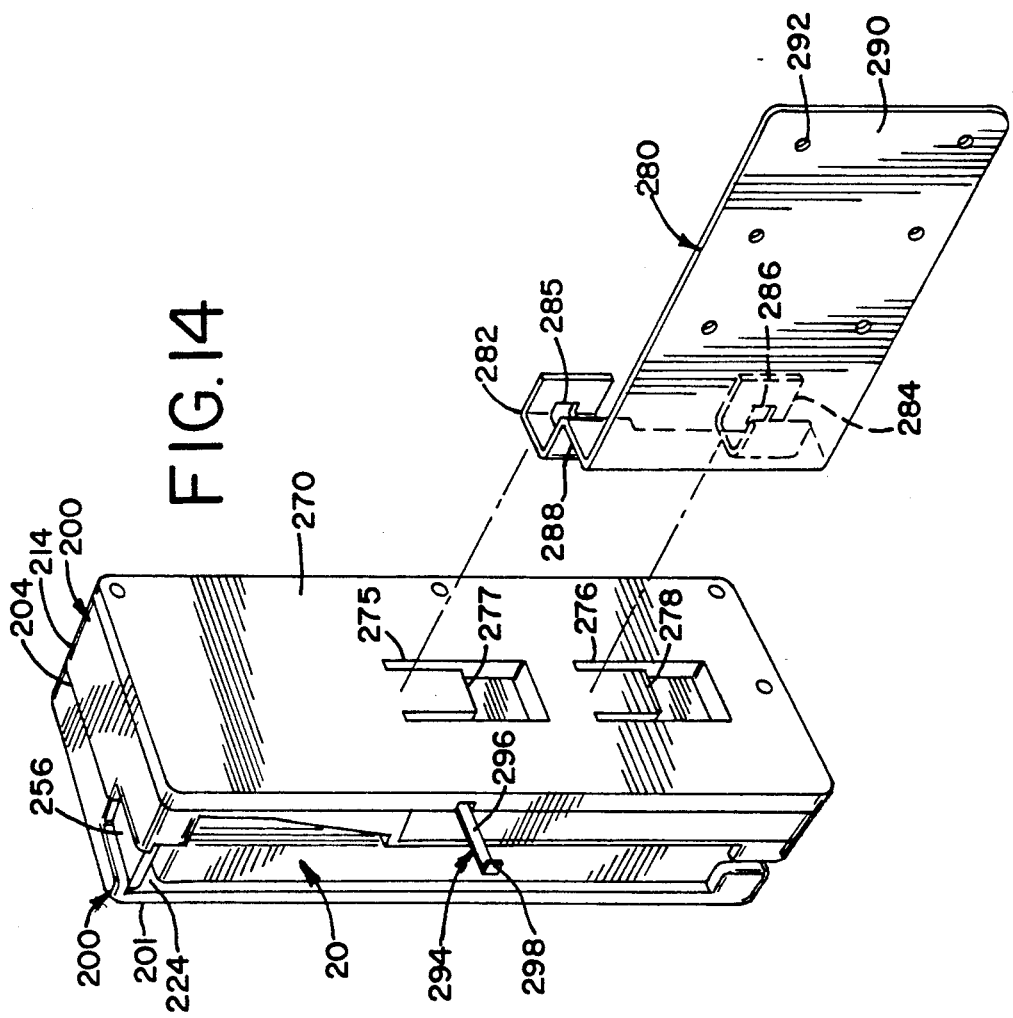

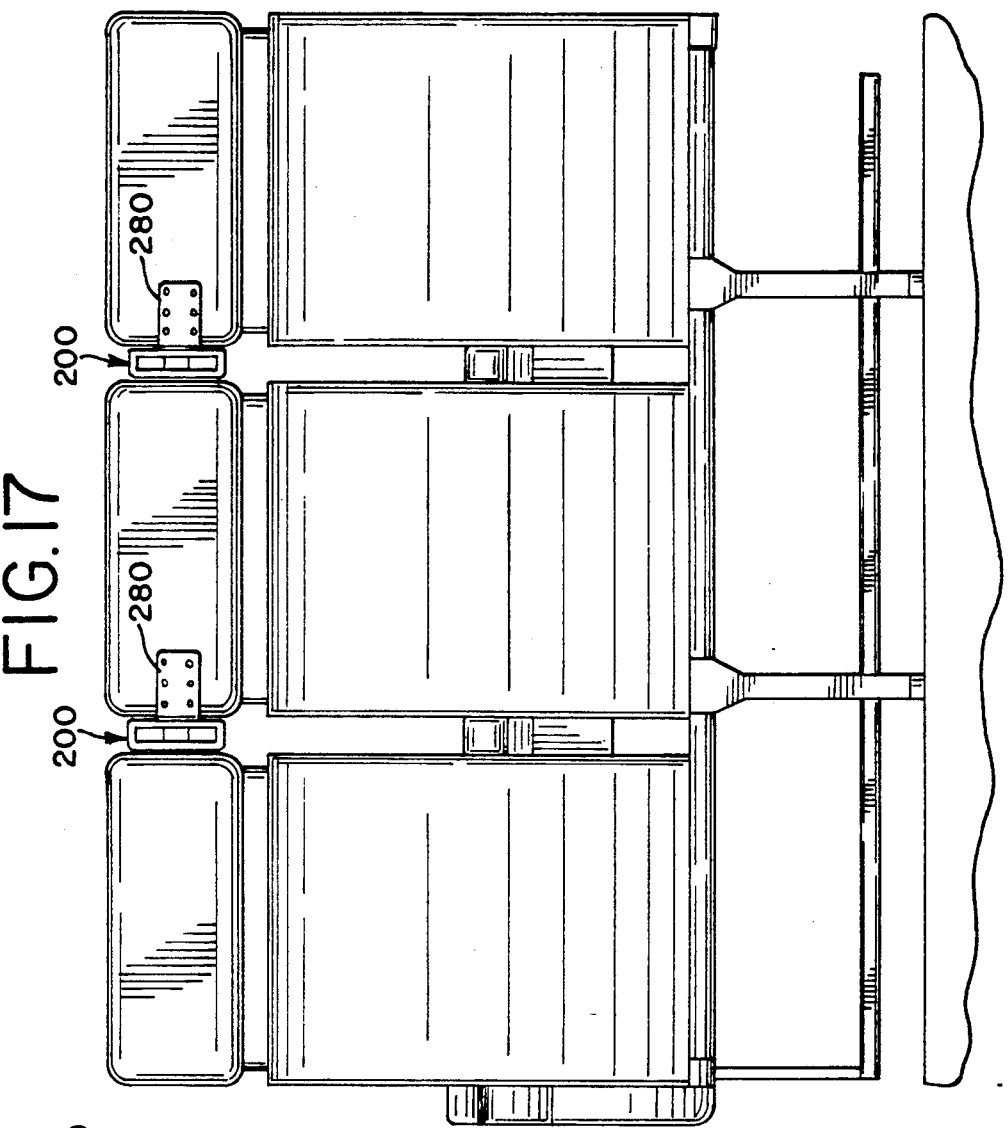
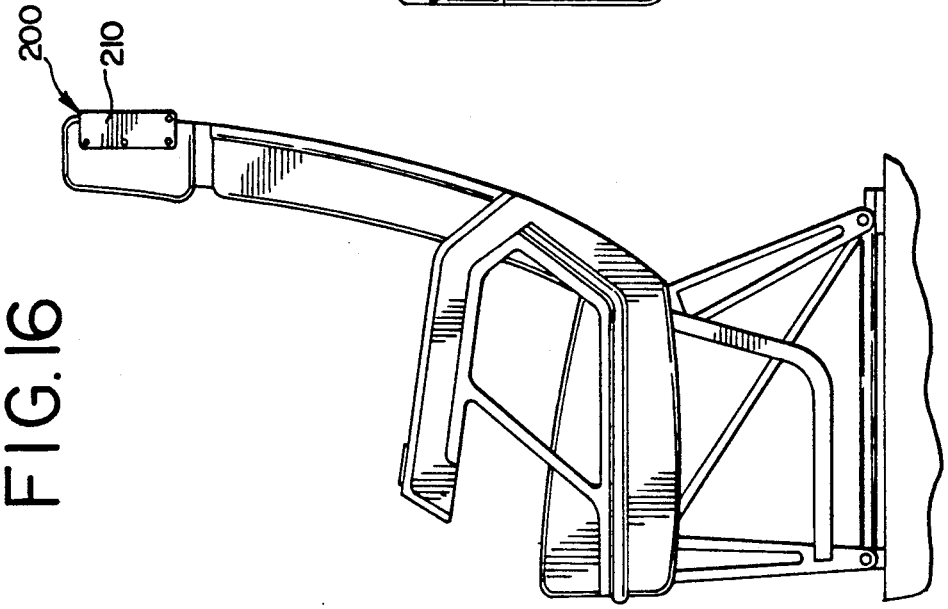

TELEPHONE HANDSET HOLDER ASSEMBLY

RELATED APPLICATION

This patent application is a continuation-in-part of the patent application of Albert Dietzig and Jerome L. Oldanni for a Telephone Handset, U.S. Ser. No. 07/520,404, filed May 8, 1990.

BACKGROUND OF THE INVENTION

This invention relates to telephones and, more particularly, to telephone handset holders.

Telephone construction, operation, and design have changed dramatically since the invention of the telephone by Alexander Graham Bell in U.S. Pat. No. 174,465. Early telephones were cumbersome, crank operated and utilized a separate earpiece connected by a cord to stationary telephone box. The telephone box was mounted on a wall and had a speaker cone providing a mouthpiece. In the 1950s, black bulky telephones were in use with a stationary base on which was mounted a rotatable dial. A movable handset with an earpiece and mouthpiece was connected by a cord to the stationary base. In the 1980s, lighter weight white and colored handsets were developed with pushbuttons between the earpiece and mouthpiece or with pushbuttons on the base. Pushbutton telephones have generally replaced rotary telephones.

Pay telephones or telephone pay station included several slots for the deposit of coins of varying denominations. A typical arrangement allowed the deposit of nickels, dimes and quarters so that payment of various amounts could be utilized in connection with the pay station. This arrangement was first used with manual telephones in which the initial deposit of a single coin would signal the operator that a call was to be placed. Additional coins were added for payment of calls to long distance locations. Internal arrangements of gongs transmitted various sounds back to the operator and gave the operator an indication of proper coin deposit. Eventually, telephone pay stations became dial operated, and an operator would normally not be required in order to place local calls. Various arrangements for actuating the equipment and for accepting and returning coins were developed, including electronic totalizers that were able to count and accurately register the number and denomination of coins deposited. Such totalizers also facilitated the development and utilization of single slot pay stations in which a single slot accepted coins of various denominations.

Some coin operated telephones and public telephones were developed with a slot or card swipe to receive a telephone identification credit card, or other card with a magnetic strip to enable the user to make calls without the need for cash/coins, by charging the telephone call to the user's account. Telephones that accept credit cards represent a much more recent development that has found widespread use. Pay telephones that accept credit cards are sometimes found in airports, railroad stations, etc., and have been well received by travelers.

Recent development and adaptation of the pay station have permitted use in commercial aircraft. Credit card-accepting pay stations have been incorporated into commercial aircraft where, by means of radio-telephone links, telephone service can be made by the user from the commercial aircraft to ground-based telephone equipment. Aircraft telephones themselves have typically been installed on bulkheads located adjacent to flight-attendant stations. This arrangement requires the user to leave the passenger seat to go to the location of the on board pay station to initiate the call. If the pay station is equipped with a wireless telephone unit, the flight attendant often becomes involved in providing the user with the hand-held telephone.

Wireless aircraft telephones have been provided with a credit card and reader. In this type of system, the user has to walk to the phone station, insert and leave the credit card in the handset mount to release the handset, then carry the handset back to the passengers seat, and after use, replace the handset and retrieve the credit card. However, with this type of system the passenger cannot obtain the handset during turbulence or at other times when passengers are required to remain in their seats. Furthermore, it is inconvenient to obtain a handset during the time meals are being served and in particular when ones seat is not located on the aisle. Such arrangements fail to afford the convenience and safety, an aircraft passenger might desire in connection with the placement of a call.

In the 1980s, personal computers (PCs) were mass produced for businessmen, word processing personnel, financial analysts, bankers, and other consumers. Such personal computers were generally more compact then their predecessors, had greater memory capabilities, and faster processing times. Lap top computers and other portable computers were also produced. Computers can be hooked up with data bases and other computers at distant or remote locations via a modem.

Over the years a variety of telephone handsets, holders, and other telecommunication equipment have been suggested. Typifying these prior art telephone handsets and telecommunication equipment are those shown in U.S. Pat. Nos. 2,557,393; 4,252,994; 4,488,009; 4,587,379; 4,661,659; 4,672,661; 4,727,569; 4,788,420; 4,811,387; Des. 276,723; Des. 280,986; Des. 297,839; Des. 299,136; Des. 299,137; and Des. 301,034. These prior art telephone handsets, holders, and telecommunication equipment have met with varying degrees of success.

It is, therefore, desirable to provide a telephone handset and holder assembly with improved features.

SUMMARY OF THE INVENTION

An improved telephone handset and holder assembly are provided which can be used for many purposes, but are particularly useful for travelers in airplanes, trains, ships, and buses to link up with reservation systems, other data base systems, or their office. Advantageously, the novel telephone handset and holders assembly are versatile, comfortable, and efficient. The novel telephone handset and holder assembly are also compact, dependable, and effective.

To this end, the improved handset holder assembly comprises a lightweight portable self-contained housing which houses, contains, holds, and substantially envelopes the telephone handset. The housing can have solid walls, including a back wall, side walls, and end walls and has a front access opening without a face plate. Desirably, the housing has ar internal telephone handset-receiving compartment or chamber which has a size, span, and volume greater than the telephone handset. A bracket or other attachment means can be provided to securely mount the housing outwardly of and to an exterior surface, such as to a seat of an airplane, train, bus, or ship.

In the preferred form, the novel handset holder assembly has a special module and housing with a compartment or chamber which is shaped and contoured complementary to the telephone handset to receive the telephone handset. The compartment has a floor or bottom section with an inclined ramp that slopes downwardly to enhance gravity discharge and egress of the telephone handset from the compartment. Preferably, the floor comprises a generally triangular-shaped section with a round apex and an upright front lip section. An elastomeric biasing member, such as a sponge rubber-like pad, can be attached to the back wall of the compartment to enhance discharge of the telephone handset from the compartment.

A special lock assembly can be provided to securely lock the telephone handset in the compartment (chamber) of the handset holder. The special lock assembly has a locking finger with a hooked portion which engages a credit card-receiving and lock-engaging slot of the telephone handset. The lock assembly can also have a manually depressible release finger to pivot or otherwise move the hooked portion out of the slot to free (unlock) the telephone handset without requiring insertion of a credit card. A spring, such as a compression spring or leaf spring can can be provided to urge the hooked portion to its locking position in the slot.

In order to efficiently and conveniently mount the handset holder assembly to a surface, such as to a seat, chair, or bulkhead of an aircraft, train, bus, limousine, or boat, the handset holder assembly can have a special mounting bracket. Locking means, such as a slide bar, can be provided to releasably lock the mounting bracket to the holder module and housing. In the preferred form, the module has sidewalls without a face plate and has a reversible interchangeable mounting plate which can be attached to either sidewall of the holder module for flexibility and to accommodate mounting of the bracket to the left or right hand portions of a seat (chair) without the need for separate left and right hand brackets or other additional parts. Desirably, the bracket has at least one slotted channel member to slidably engage a seat or tooth of a slotted complementary portion on the mounting plate.

The handset holder can also include a second compartment chamber to store a takeup reel or spool and/or the cord of the telephone handset.

The preferred telephone handset has two sets of control keys, key pads, and/or push buttons. One set activates telephone numbers and the other set activates, controls, and/or signals a display screen of a computer or other central processing unit. One set can be on the front and the other set can be on the back of the telephone handset. In the illustrated embodiment, the telephone activating set is positioned on the front of the telephone handset between the earpiece and mouthpiece, and the computer control set is located on the back of the telephone handset.

The preferred telephone handset has a card-receiving slot, located either on the back or preferably the front of the telephone handset, to receive an identification card or credit card with a magnetic strip thereon. Desirably, the slot has an enlarged inlet opening providing a mouth with diverging lips or at least one flared, slanted inclined side. In the preferred form, the mouth is located in proximity to the top of the telephone handset and is adjacent one of the sidewalls of the handset. The bottom of the telephone handset can have a cord-receiving opening, adjacent the other of said sidewalls to provide a port or socket to receive a plug or connector of a telephone cord.

The universal telephone handset can also have a recessed mouthpiece for enhanced acoustical transmission. In the preferred form, the recessed mouthpiece has triangular sides and an inclined ramp which slopes downwardly and away from said earpiece towards the bottom of the telephone handset.

A more detailed explanation of the invention is provided in the following description and claims taken in conjunction with the accompanying drawings.

BRIEF DESCRIPTION OF THE DRAWINGS

FIG. 2 is a front view of the telephone handset;

FIG. 3 is a left side view of the telephone handset;

FIG. 4 is a right side view of the telephone handset;

FIG. 5 is a top view of the telephone handset;

FIG. 6 is a bottom view of the telephone handset;

FIG. 7 is a back view of the telephone handset; and

FIG. 9 is a perspective view of a telephone handset stored in a holder assembly in accordance with principles of the present invention and showing in phantom or dotted line the telephone handset after it has been removed from the holder assembly;

FIG. 10 is a front view of the telephone handset and holder assembly;

FIG. 11 is a cross-sectional view of the telephone handset and holder assembly taken substantially along line 11—11 of FIG. 10;

FIG. 12 is a side view of the telephone handset and holder assembly in a locked position with the mounting plate removed;

FIG. 13 is a side view of the telephone handset and holder assembly in an unlocked position with the mounting plate removed;

FIG. 14 is a perspective assembly view of the handset holder assembly and bracket;

FIG. 15 is a right side view of the handset holder assembly with portions of the bracket shown in cross-section;

FIG. 16 is a left side view of an aircraft seat with a handset holder assembly mounted thereto;

FIG. 17 is a back view of a row of aircraft seats with telephone handsets and holder assemblies mounted to the sides thereof.

DETAILED DESCRIPTION OF THE PREFERRED EMBODIMENTS

Figure 1:
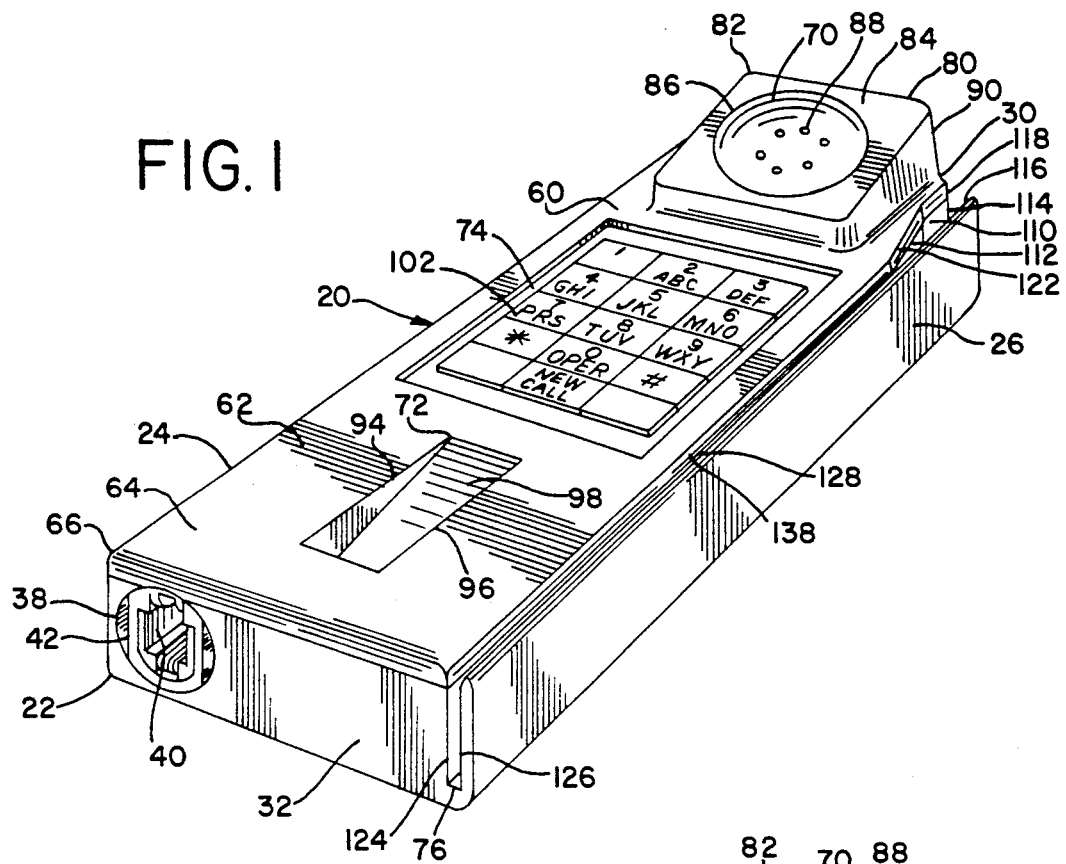
FIG. 1 is a perspective view of a telephone handset in accordance with principles of the present invention.

A universal telephone and computer control handset 20 and holder assembly 200 (FIG. 9) are provided which are light weight, compact, and user friendly. Advantageously, the flexible handset 20 and holder assembly 200 have excellent market appeal, are convenient, and attractive to businessmen, travelers, and others.

The handset 20 (FIG. 1) has an elongated separable housing 22 which can be molded out of impact-resistant plastic and can comprise two or more separable parts separated by a parting line for access into the interior of the handset. Other materials can be used.

The housing 22 of the handset 20 has substantially planar or flat, upright sidewalls 24 and 26 including a left sidewall 24 (FIG. 3) and a right sidewall 26 (FIG. 4). The sidewalls 24 and 26 are parallel and generally rectangular with rounded corners 28 and 29 (FIGS. 2 and 4). The housing 22 of the handset 20 also has upright end walls 30 and 32 as best shown in FIGS. 5-7. The ends walls include a substantially imperforate top wall 30 (FIG. 5) providing the top of the handset and a bottom wall 32 (FIG. 6) providing the bottom of the handset. The ends walls are parallel, substantially planar or flat, and are generally rectangular with rounded corners 34 and 36.

The bottom wall 32 (FIG. 6) has a cord-receiving opening 38 in proximity to the left sidewall 24. The cord-receiving opening 38 provides a port or socket to receive a plug 40, adapter, and/or connector 42, such as a swivel style connector sold under the Trademark and brand name UNTANGLER by Telephone Products, Inc., attached to a telephone cord 43 (FIG. 10).

As shown in FIG. 7, the housing 22 of the handset 20 has a back rearward wall 44 with a back rearwardly facing surface 46 which provides the back of the handset. The back wall and surface extends horizontally between and connects the end walls 30 and 32 to the sidewalls 24 and 26. The back surface 46 has substantially planar or flat peripheral portions 48 and is generally rectangular with rounded corners 50. The back of the handset has an array, set, and series of finger engagable, computer control keys 52 to remotely control, activate, and signal a central process unit such as a computer with a display screen. In the embodiment of FIG. 7, the computer control keys 52 comprise three columns of alpha, rectangular depressible resilient, key pads 54 in the English alphabet. Each of the columns are sequentially and progressively arranged in increasing order of the alphabet from top 30 to bottom 32 with an enter (ENT) control input key 56. The computer control keys 52 can also include arrow cursor keys 58 to move a cursor in the direction of the arrow on the display screen of a computer. For ease of use of the computer control keys 52, the handset 20 can be turned sideways and laterally 90 degrees or to some other desired position. Key pads using numbers and upper and lower case letters can also be used. The interior facing portions of the key pads 54 are electrically connected to a computer actuated electrical system within the interior of the handset and/or having switches, wires, and/or a circuit board or computer chip, etc. While the illustrated computer control keys are preferred for best results, other arrangements, orientation, pattern, number, shapes, or location of the computer control keys can be used, if desired, and foreign language letters and/or numbers can be used in other countries, if desired.

The housing 22 of the handset 20 has a front wall or front 60 (FIG. 2) with a front forwardly facing surface 62 which provides the front of the handset. The front wall and surface extends between and connects the end walls 30 and 32 to the sidewalls 24 and 26. As shown in FIGS. 3 and 4, the front surface 62 has substantially planar or flat portions 64 which are positioned substantially parallel to the back portion 48 of the back 46 of the handset 20. The front surface 62 is generally rectangular as viewed from the front with rounded corners 66.

The front wall 60 (FIGS. 1 and 2) of the handset 20 has an earpiece 70 adjacent the top 30 of the handset, a mouthpiece 72 in proximity to the bottom 32 of the handset, and an intermediate control section 74 positioned between the earpiece 70 and the mouthpiece 72. The front wall 60 has an elongated card-receiving slot 76 or swipe to receive the lower portions of an identification card or credit card with a magnetic strip thereon.

The earpiece can include a speaker which is connected to a telephone receiving system comprising wires, switches, etc. within the interior of the handset to receive telephone signals from other telephones and unscrambles and converts those signals to recognizable audible tones for the listener's ear. In the embodiment of FIGS. 1 and 2, the earpiece comprises a raised earpiece 70 which extends forwardly of the planar front portion 64 of the front wall 60. The raised earpiece 70 has a substantially rectangular periphery 80 as viewed from the front with rounded corners 82. The raised earpiece 70 has a substantially planar or flat sloping portion or section 84 which extends in a direction upwardly and away from the mouthpiece 72 at an angle of inclination ranging from about 15 to 75 degrees. Positioned on the sloping portion 72, surrounded by the periphery 80, is a concave circular earpiece portion or section 86 with a series of apertures 88 which provides earholes. As shown in FIG. 5, the earpiece 70 can have an inverted U-shaped top portion or section 90 which is positioned flush and in coplanar relationship to the top 30. The top portion 90 can have rounded corners 92.

The mouthpiece can include a microphone which is connected to a telephone transmitting system comprising wires, switches, etc. within the interior of the handset which scrambles and converts the user's voice (words) into electrical impulses or signals and transmits those telephone signals to the receiving telephone via telecommunication equipment. In the embodiment of FIGS. 1 and 2, the mouthpiece comprises a recessed mouthpiece 72 with triangular upright sides 94 and 96. An inclined ramped portion or section provides a lower front-facing ramp 98 which extends between and connects the triangular sides 94 and 96 of the mouthpiece 72. The ramp 98 slopes downwardly in a direction away from the earpiece 70 and towards the bottom 32 of the handset 20 at an angle of inclination ranging from about 15 to 75 degrees. The lower portion of the ramp 98 has three inclined slits 100 which provide mouthpiece holes. More or less, or different shaped mouthpiece holes can also be used. The ramp 98 and triangular sides 94 and 96 of the mouthpiece 72 cooperate with each other to define a recessed opening and chamber which can enhance acoustical transmission of the user's voice and lessen outside noise.

The intermediate control section 74 (FIGS. 1 and 2) of the front wall 60 of the handset 20 has a set, array, or series of finger engagable, telephone activating control keys 102 to enable the user to send (dial) and transmit the desired telephone number. In the embodiment of FIGS. 1 and 2, the manually engagable control keys comprises resilient depressible, alpha numeric, rectangular key pads 104. The interior facing portions of the key pads 104 are electrically connected to a telephone transmission system comprising switches, wires, etc. within the interior of the handset. While the illustrated telephone control keys are preferred, other arrangements, orientation, pattern, number, shapes, or location of the telephone control keys can be used, if desired, and foreign language letters and/or numbers can be used in other countries, if desired.

Figure 8:
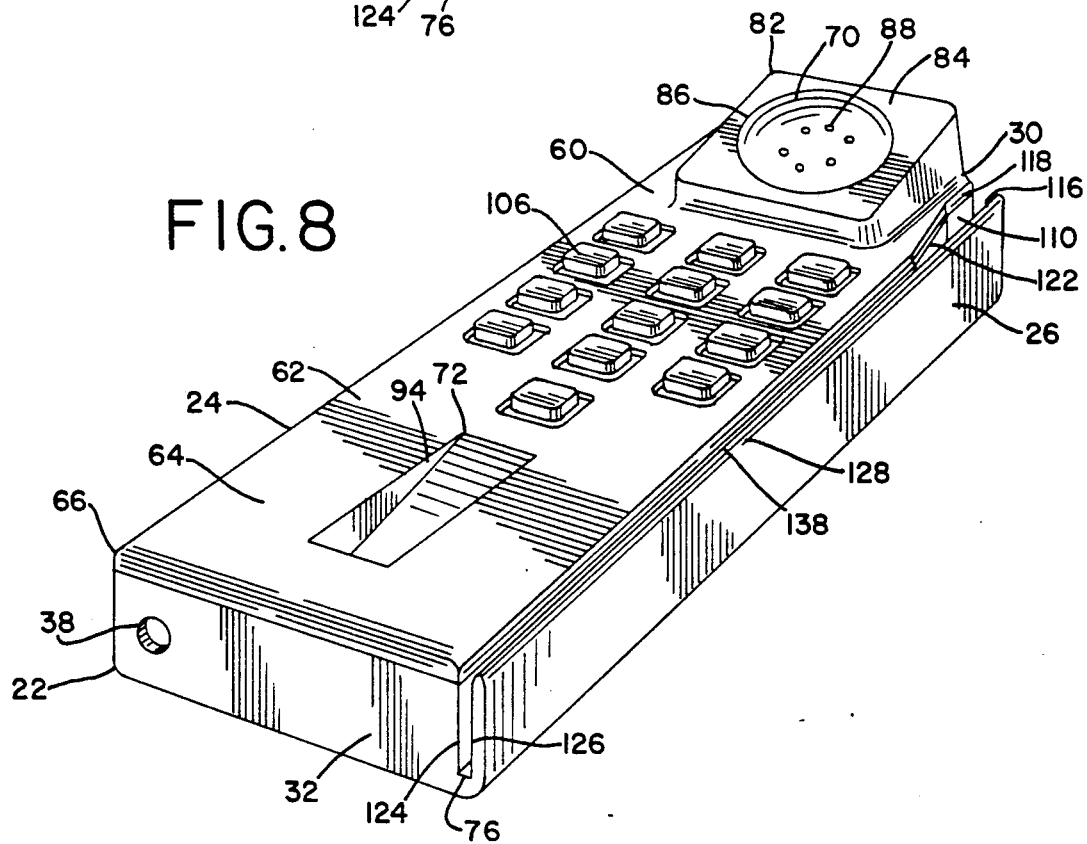
FIG. 8 is a perspective view of a telephone handset with pushbuttons in accordance with principles of the present invention.

Pushbuttons can be used in lieu of key pads for the telephone control keys and/or the computer control keys. The handset 120 of FIG. 8 is structurally and functionally similar to the handset 20 of FIGS. 1-5, except that raised rectangular pushbuttons 106 are used instead of key pads. In some circumstances, it may be desirably to use cylindrical, curved, rounded, or concave pushbuttons, or pushbuttons of other configurations.

The card-receiving slot 76 (FIGS. 1 and 2) is substantially parallel and adjacent the right sidewall 26. As viewed from the front wall 60, the slot extends vertically through the top 30 and bottom 32 of the handset 20. To facilitate entry of the card, the slot 76 has an enlarged card-receiving inlet opening 110 providing a mouth. The specially shaped mouth 110 of the illustrated embodiment also provides a latch receiving-opening to receive and engage a locking latch 258 (FIG. 13), such as connected to a handset housing or wall. In the embodiment of FIGS. 1 and 2, the mouth 110 has a substantially triangular lower section 112 and a rectangular upper section 114. The mouth 110 has a straight outer right side 116 extending along the upper and lower sections 112 and 114. The outer right side 116 communicates with the slot 76 and is positioned contiguous with the slot 76 along the right sidewall 26. The upper rectangular section 114 has an upright inner left side 118 positioned substantially parallel to the right outer side 116. The lower section 112 has a tapered angled left camming side 122 providing a cam or inclined camming surface which diverges and slopes inwardly and upwardly in a direction towards the top 30 of the handset 20 at an angle of inclination ranging from about 15 to 45 degrees relative to the elongated vertical slot 76 as viewed from the front wall 60. The angled side 122 extends between and connects the inner left side 118 to the elongated left wall section 124 of the slot 76. The elongated left wall section 124 is positioned across and parallel to the elongated right wall section 126 of the slot 76.

The telephone handset 20 comprises a credit card station with a card receiving slot structure 76 having an open outer edge 118 which is accessible for receiving a stripe containing portion of a credit card for manually controllable movement of the magnetic stripe along a path defined in the slot structure 76 while the card is still manually gripped by the user. The slot structure 76 includes a pair of spaced apart opposite sidewalls sections 124 and 126. The slot 76 provides a longitudinal path of movement for the credit card. The slot structure 76 can also include a guide provided between the sidewall sections 124 and 126 intermediate the ends. Sensors 138 of an interval magnetic card reader can be positioned in front of the window 128 within the handset 20 for reading the characters on the magnetic stripe of a credit card to enable the calls to be charged when particular characters are present on a credit card and ready by the sensors 138 of the reader.

The slot structure 76 includes an credit card receiving end 110 in which the tapered upper portion 122 of the left sidewall section 124 is inclined and bent away from the right sidewall section 126 to provide a notch to facilitate insertion of the card until the longitudinal edge of the card directly engages the sensor 138 of the card reader. The slot structure 76 can includes an outwardly sloping surface adjacent an opposite, exit end portion of the slot structure which directs the card outwardly of the open edge of the slot structure 76 upon passage of the card beyond the card reader sensor 138 to facilitate withdrawal of the card from the slot 76 by the user.

In the illustrative embodiment, the telephone handset 20 includes an elongated, generally vertically extending slot structure 76 on the right hand side of the front wall 60. The slot structure 76 has an outline or profile which matches the right sidewall 26 of the telephone handset 20. The slot structure 76 is formed by a pair of elongated opposite, spaced apart sidewall sections 124 and 126 made of nonmagnetic material such as impact and resistant plastic or stainless steel sheet material. The facing inside surfaces of the left hand and right hand slot structure sidewall sections can be maintained in spaced apart parallel relation by an intermediate guide member also formed of impact-resistant plastic or stainless steel.

The middle or intermediate portion of the slot structure of the left hand sidewall section 124 is formed with a rectangular shaped window 128 so that one or more sensors or sensing elements 138 of a magnetic card reader can read the magnetic characters on the surface of a credit card passing by in front of the window 128 while guided along a prescribed path by the guide rib of the guide slot. The card reader can be housed in the interior of the handset.

At the upper end of the slot structure 76, the left hand sidewall section is angled along surface 122 to diverge outwardly and away from the opposite right hand sidewall section 126 so as to provide a wider open portion 110 at the upper end of the slot structure 76 to facilitate manual insertion of a card into the slot structure 76.

In order to use a credit card, a telephone user grasps the credit card and inserts the lower portion of the credit card containing the magnetic stripe into the slot 76 so as to face the window 128 and sensor 138 of the magnetic card reader, while still gripping the upper portion of the credit card. The user continues to grip the credit card and moves their hand downwardly, all the time pressing the longitudinal edge against an upper guide surface of the guide. This engagement insures that the magnetic stripe of the credit card will move along a generally vertical path, so as to align the magnetic strip to pass directly in front of the card reader window 128 so that the card reader may sequentially read and record the magnetic information contained on the card. When the lower edge of the card first passes the upper edge of the window 128, the card reading process begins to take place and continues until the upper or trailing end of the card moves past the lower edge of the window 128.

After activating the handset with a credit card, the user can operate the telephone and/or computer keys, as desired. The user can also contact the telephone operator by dialing zero (0), or can operate the telphone or use the computer control keys via preauthorized access codes.

As shown in FIGS. 9 and 10, the telephone handset holder assembly 200 includes a light weight, impact-resistant handset holder 201 including a portable module 202 comprising a substantially rectangular housing 204 to house, contain, cradle, hold, enclose, store, and generally envelope the telephone handset 20. The housing 204 has generally rectangular solid end walls 206 and 208 and generally rectangular solid vertical walls including upright side walls 210 and 212 and an upright back wall 214. The end walls include a top wall 206, which provides a roof or ceiling with a horizontal top exterior surface 216, and a bottom wall 208, which provides a floor with a horizontal bottom exterior surface 218. The top wall 206 has a U-shaped finger-receiving slot 220. The bottom wall 208 has a cord-receiving slot 222 which extends horizontally from the front of the bottom wall 208 towards the back wall 214. The vertical walls 210–214 are parallel and extend vertically between and connect the end walls 206 and 208. The corners of the handset holder assembly 200 are preferably rounded.

The housing 204 (FIGS. 9 and 10) of the handset holder assembly 200 has a front access handset-opening 224 which communicates with an internal telephone handset-receiving compartment 226. The compartment 226 comprises an internal chamber 227 with an outwardly flared earpiece-receiving cavity 228. The compartment 226 and chamber 227 have a shape and contour substantially complementary to the external configuration and shape of the telephone handset 20 and has a size, span, width, and volume slightly longer than the telephone handset 20 to matingly receive the telephone handset 20.

The floor 208 (FIG. 12), providing the bottom of the compartment 226, has a generally triangular section 230 which extends upwardly into the internal chamber 227. The triangular section 230 has a rounded apex 232 and an inclined front ramp 234 which slopes and extends downwardly and forwardly at an angle of inclination ranging from 15 degrees to 75 degrees, preferably about 30 degrees to 45 degrees. The ramp 234 communicates with the front access opening 224 to enhance egress and gravity discharge of the telephone handset 20. A front abutment lip 236 has a vertical lip slot 238 (FIG. 9) which extends between and communicates with the cord-receiving slot 222 and the front access opening 224. In the illustrated embodiment, the lip slot 238 has the same width and is aligned in registration with the cord-receiving slot 222.

As shown in FIG. 13, the back wall (rear wall) 214 of the handset holder assembly 200 has an inwardly facing back surface 240 which provides the back of the internal chamber 227. An elastomeric resilient biasing member 242, comprising a cylindrical or rectangular section of sponge rubber or rubber-like elastomeric plastic, is glued or otherwise secured to a central intermediate portion 244 of the back surface 240. The elastomeric resilient biasing member 242 extends into the internal chamber 227 to engage and enhance discharge and egress of the telephone handset 20 from the internal chamber 227 through the front access opening 224.

The handset holder 201 has an overhead locking assembly (lock assembly) 250 as shown in FIG. 12, to lock and secure the telephone handset 20 in a closed locked storage position in the internal chamber 227. The locking assembly 250 has a pivot pin portion 252 which is positioned between and in proximity to the roof 206 and the internal chamber 227. As best shown in FIG. 11, the pivot pin portion 252 is pivotally connected to the sidewalls 210 and 212. The locking assembly 250 has a rearwardly downwardly sloping locking finger 254 (FIG. 12) and a manually depressible downwardly sloping front finger 256. The locking finger 254 is cantilevered from and extends rearwardly of the pivot pin portion 252. The locking finger 254 has a rearward downwardly latch or hooked portion 258, that is moveable from a downward locked position to lockably (lockingly) engage the card-receiving and lock-engaging slot 110 of the telephone handset 20, to an upward unlocked open position (which is spaced above the telephone handset 20 before the telephone handset 20 is removed from the internal chamber 227). The front finger 256 has an upwardly facing finger-engaging button portion 260, which as aligned in registration below the U-shaped finger receiving opening 220 of the top wall 206. Depressing the bottom portion 260 downwardly will pivot the locking finger 254 to its upward unlocked position as shown in FIG. 13. A compression spring 262 or leaf spring can be wedged between and engage the downwardly-facing interior surface of the top wall 206 and the upper surface of the locking finger, at a location between the pivot pin portion 252 and the hooked portion 258, to bias and urge the locking finger in its downward locked position.

The module 202 (FIG. 9) and housing 204 of the handset holder 201 has an interchangeable reversible, side mounting plate 270 which is attached to one of the sidewalls 210 and 212. The mounting plate 270 is substantially rectangular with rounded corners. The mounting plate 270 has a front face 272 and an outer side face 274. The side face 274 has vertical aligned generally U-shaped slotted portions 275 and 276 with U-shaped bracket-engaging locking teeth or lugs 277 and 278.

The handset holder assembly 200 (FIG. 14) also has a reversible interchangeable, side mounting bracket 280 which is made of metal, such as aluminum, or impact-resistant plastic. The bracket has a bifurcated pair of vertically aligned, U-shaped channel support members 282 and 284 which slides into the U-shaped slotted portions 275 and 276 of the mounting plate 270 to securely engage the teeth or lugs 277 and 278 on the mounting plate 270. Each of the channel support members 282 and 284 have a horizontal slide bar-receiving slot 285 or 286. The mounting bracket 280 also has an intermediate bight section 288 for positioning parallel to the mounting plate 270 and has an elongated plans or flat, rectangular, lateral plate member 290 for positioning transverse and perpendicular to the mounting plate 270. The lateral plate member can be rectangular with rounded corners. Desirably, lateral plate member 290 is perforated and foraminous with fastener holes 292 to facilitate attachment, via screws or other fasteners, to a surface or frame of a seat (chair), wall, or bulkhead of an airplane, train, vehicle, or ship.

A reciprocatingly, push/pull, horizontal, locking safety slide bar 294 (FIG. 14) slidably extends into the mounting plate 270 to releasable lock and secure the channel members 282 and 284 of the bracket 280 to the bracket engaging teeth or lugs 277 and 278. Structurally, the slide bar 294 is L-shaped with an elongated slidable locking portion 296 and a relatively short, manually grippable (finger grippable) front abutment portion and handle 298. The slide bar 294 is moveable from a forward open position, which extends forwardly of the mounting plate 270, as shown in FIG. 14, for removal of the bracket, to a rearward closed position in which the front abutment portion and handle 298 is positioned flush against the front face 274 of the mounting plate 270 and in which the elongated slidable portion 296 (FIG. 15) of the slide bar 294 extends through one of the slide bar-receiving slots 285 or 286 of the support channel members 282 or 284 in order to securely lock the bracket 280 to the mounting plate 270.

Figure 18:
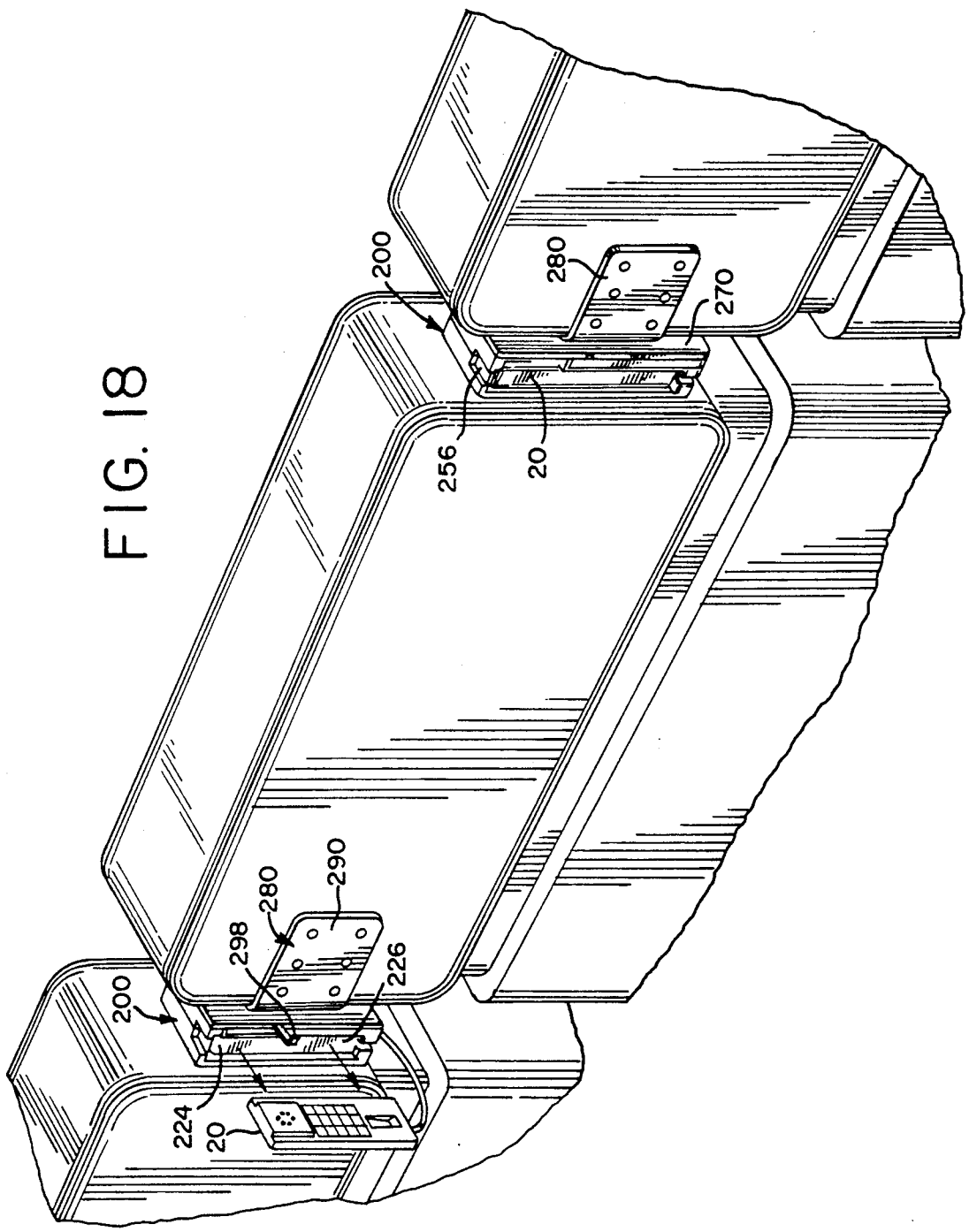
FIG. 18 is an enlarged fragmentary perspective view of the upper portion of the row of aircraft seats of FIG. 17, with the left telephone handset being removed from the left holder assembly and the right telephone handset stored in the right holder assembly.

Advantageously, the reversible bracket 280 and mounting plate 270 permit the handset holder 201 to be rapidly and securely mounted to the left or right hand portion of the back or sides of an aircraft seat, as shown in FIGS. 16-18, without the necessity of additional parts and equipment.

Among the many advantages of the novel telephone handset and holder assembly are:
1. Outstanding appeal to businessmen and travelers.
2. Superior performance.
3. Versatile.
4. Reliable.
5. Convenient.
6. Easy to use.
7. Simple to operate.
8. Compact.
9. Economical
10. Safe
11. Efficient
12. Effective Although embodiments of the invention has been shown and described, it is to be understood that various modifications and substitutions, as well as rearrangements of parts, can be made by those skilled in the art without departing from the novel spirit and scope of this invention.

What is claimed is:

1. A telephone handset holder assembly, comprising:
   a module having a chamber for receiving a telephone handset; and
   a bracket secured to said module for mounting said assembly to a seat;
   said module including a mounting plate in the absence of a face plate, said mounting plate having means for releasably engaging said bracket;
   said module having sidewalls and said mounting plate is attachable to either sidewall.

2. A telephone handset holder assembly in accordance with claim 1 wherein said module comprises a housing defining an access opening and a compartment for receiving a telephone handset, and
   said compartment has a floor with an inclined ramp sloping downwardly and communicating with said access opening for enhancing gravity discharge of said telephone handset from said compartment.

3. A telephone handset and holder assembly, comprising:
   a telephone handset having an earpiece and a mouthpiece and a card-receiving and lock-engaging slot;
   a module having a chamber shaped generally complementary to said telephone handset for receiving said telephone handset; and
   lock means operatively associated with said module for engaging said card-receiving and lock-engaging slot of said telephone handset to lock said telephone handset in said chamber.

4. A telephone handset and holder assembly in accordance with claim 3 wherein said lock means comprises a locking finger with a hooked portion for engaging said slot of said telephone handset and a manually depressible finger for moving said hooked portion out of said slot to unlock said telephone handset.

5. A telephone handset and holder assembly in accordance with claim 3 wherein said lock means includes spring means seated upon said locking finger for urging said hooked portion into said slot.

6. A telephone handset and holder assembly in accordance with claim 3 wherein said chamber has a roof and said lock means includes an overhead lock assembly in proximity to said roof and said chamber, and said lock assembly has a latch for engaging said slot of said telephone handset.

7. A telephone handset and holder assembly in accordance with claim 3 including a bracket for securing said module to a surface.

8. A telephone handset holder assembly in accordance with claim 3 including a bracket secured to said module for mounting said assembly to a seat or chair; said module includes a mounting plate with slotted means and said module includes a slide bar for releasably locking and securing said bracket to said slotted means of said mounting plate.

9. A telephone handset holder assembly, comprising:
   a module having a chamber for receiving a telephone handset; and
   a bracket secured to said module for mounting said assembly to a seat;
   said module including a mounting plate in the absence of a face plate, said mounting plate having slotted means for releasably engaging said bracket;
   said module includes a slide bar for releasably locking and securing said bracket to said slotted means of said maounting plate; and
   said bracket comprising at least one U-shaped channel member for slidably engaging said slotted means of said mounting plate.

10. A telephone handset holder assembly, comprising:
    a housing defining an access opening and a compartment for receiving a telephone handset; and
    said compartment having a floor with an inclined ramp sloping downwardly and communicating with said access opening for enhancing gravity discharge of said telephone handset from said compartment; and
    wherein said floor has a central portion comprising a generally triangular section extending upwardly into said compartment, said triangular section having a front portion comprising said inclined ramp.

11. A telephone handset holder assembly in accordance with claim 10 wherein said triangular section has a rounded apex.

12. A telephone handset holder assembly in accordance with claim 10 wherein said floor has a front lip section extending upwardly from said ramp.

13. A telephone handset holder assembly in accordance with claim 10 including elastomeric biasing means for enhancing discharge of said telephone handset from said compartment.

14. A telephone handset holder assembly in accordance with claim 10 including lock means for releasably locking said telephone handset in said compartment.

15. A telephone handset holder assembly, comprising:
    a module comprising a substantially rectangular housing having end walls including a top wall providing a roof and a bottom wall providing a floor, said end walls having substantially parallel exterior surfaces, said floor defining a cord-receiving slot, said top wall having a substantially U-shaped finger-receiving opening said housing having an upright back wall extending downwardly from said top wall and substantially parallel sidewalls connected to said back wall and said top wall;
    said housing defining a front access handset-opening and telephone handset-receiving compartment comprising an internal chamber communicating with said access opening for receiving a telephone handset, said chamber being substantially complementary to said telephone handset;

said floor having a substantially triangular section extending upwardly into said chamber, said triangular section having a rounded apex and an inclined front ramp sloping downwardly and communicating with said front access opening for enhancing egress and gravity discharge of said telephone handset from said chamber through said front access opening, said floor having a front abutment lip extending upwardly from said front ramp, and said lip having a slot aligned in registration communicating with said cord-receiving slot;

said back wall having an inwardly facing back wall-surface comprising a central intermediate portion;

an elastomeric resilient member secured to said intermediate portion of said back wall surface and extending into said chamber for engaging and enhancing discharge of said telephone handset from said chamber through said front access opening, said elastomeric resilient member comprising rubber or rubber-like plastic;

a locking assembly for locking said telephone handset in said chamber, said locking assembly comprising a pivot pin portion positioned in proximity to said roof and said chamber and pivotally connected to said sidewalls, a rearward downwardly sloping locking finger cantilevered and extending rearwardly of said pivot pin portion, said locking finger having a downwardly hooked portion and being movable from a downward locked position for lockably engaging a card-receiving and lock-engaging slot of the telephone handset to an upward unlocked open position spaced from said telephone handset, a manually depressible downwardly sloping front finger cantilevered and extending forwardly of said pivot pin portion for pivoting said locking finger to said upward unlocked open position, said front finger having an upwardly facing finger-engaging button portion aligned in registration below said U-shaped finger-receiving opening of said roof, and a spring wedged between and engaging said roof and said locking finger for urging said locking finger in said locked position;

an interchangeable reversible side mounting plate attached to one of said sidewalls, said mounting plate having a front face and a side face, said side face having a pair of substantially U-shaped slotted portions with substantially U-shaped bracket-engaging teeth;

a reversible side mounting bracket having a bifurcated pair of substantially U-shaped channel support members aligned in vertical registration for slidably engaging said U-shaped slotted portions and said teeth, each of said channel support members having a substantial horizontal slide bar-receiving slot, said mounting bracket having an intermediate bight section for positioning substantially parallel to said mounting plate, and an elongated substantially planar perforated lateral plate member extending laterally and substantially transverse to said mounting plate for attachment to a seat or chair; and a locking safety slide bar slidably extending into said mounting plate for releasably locking and securing said U-shaped channel support members of said bracket to said bracket-engaging teeth, said slide bar having an elongated slidable portion and a manually grippable front abutment portion providing a handle extending laterally from said slidable portion, and said slide bar being moveable from a forward open position extending forwardly of said mounting plate for removal of said bracket to a rearward closed position with said front abutment portion substantially flush against the front face of said mounting plate and said slidable portion extending through one of said slide bar-receiving slots of said support channels members for securely locking said bracket to said mounting plate.

16. A telephone handset and holder assembly, comprising:

a universal telephone and computer control handset, having substantially planar imperforate sidewalls including a left sidewall and a right sidewall, said sidewalls being substantially parallel and rectangular with rounded corners;

substantially planar and parallel end walls extending transversely between and connecting said sidewalls, said end walls including a substantially imperforate top wall providing a top and a bottom wall providing a bottom, said end walls being substantially rectangular with rounded corners, and said bottom wall defining a cord-receiving opening in proximity to one of said sidewalls and providing a socket;

a back surface providing a back extending between and connecting said end walls and said sidewalls, said back surface having a substantially planar back portion and being substantially rectangular with rounded corners, and said back having an array of finger engageable keys;

a front surface providing a front extending between and connecting said end walls and said sidewalls, said front surface having substantially planar front portions positioned substantially parallel to said planar back portions of said back, said front having an earpiece adjacent said top, a mouthpiece in proximity to said bottom, an intermediate control section positioned between said earpiece and said mouthpiece, said intermediate control section having a set of telephone activating control keys facing opposite said finger engageable keys, and said front defining a substantially vertical elongated card-receiving slot extending through said end walls, said slot being substantially parallel and disposed adjacent another one of said sidewalls, said slot having an enlarged card-receiving inlet opening providing a mouth comprising a latch-receiving opening with a substantially triangular lower section and a substantially rectangular upper section, said mouth having a substantially straight outer side disposed substantially contiguous to said slot along said adjacent sidewall, an upright inner side along said upper section positioned substantially parallel to said outer side, and a tapered angled side providing a cam surface along said lower section diverging inwardly and upwardly;

said telephone activating control keys comprising manually engagable keys providing finger engaging controls selected from the group consisting of resilient depressible key pads and pushbuttons;

said earpiece comprising a raised earpiece extending forwardly of said planar front portions, said raised earpiece having a substantially rectangular periphery as viewed from the front with rounded corner, said earpiece having a substantially planar sloping portion extending upwardly away from said mouthpiece at an angle of inclination ranging from about 15 degrees to about 75 degrees with a substantially circular earpiece portion defining a series of apertures providing ear holes surrounded by said rectangular periphery, and said raised earpiece having an inverted U-shaped top portion positioned flush and in substantial coplanar relationship with said top wall and having rounded corners; and said mouthpiece comprising a recessed mouthpiece with triangular upright sides and having an inclined ramped portion providing a ramp extending between and connecting said triangular sides, and said ramp sloping downwardly and away from said earpiece towards said bottom at an angle of inclination ranging from about 15 degrees to about 75 degrees and defining upright slits providing mouthpiece holes; and a handset holder assembly for storing and holding said telephone handset, said handset holder assembly comprising a handset holder including a module comprising a substantially rectangular housing, said housing having end walls including a top wall providing a roof and a bottom wall providing a floor, said end walls having substantially parallel exterior surfaces, said floor defining a cord-receiving slot, said top wall having a substantially U-shaped finger-receiving opening said housing having an upright back wall extending downwardly from said top wall and substantially parallel sidewalls connected to said back wall and said top wall;

said housing defining a front access handset-opening and telephone handset-receiving compartment comprising an internal chamber communicating with said access opening for receiving a telephone handset, said chamber being substantially complementary to said telephone handset;

said floor having a substantially triangular section extending upwardly into said chamber, said triangular section having a rounded apex and an inclined front ramp sloping downwardly and communicating with said front access opening for enhancing egress and gravity discharge of said telephone handset from said chamber through said front access opening, said floor having a front abutment lip extending upwardly from said front ramp, and said lip having a slot aligned in registration communicating with said cord-receiving slot;

said back wall having an inwardly facing back wall-surface comprising a central intermediate portion;

an elastomeric resilient member secured to said intermediate portion of said back wall surface and extending into said chamber for engaging and enhancing discharge of said telephone handset from said chamber through said front access opening, said elastomeric resilient member comprising rubber or rubber-like plastic;

a locking assembly for locking said telephone handset in said chamber, said locking assembly comprising a pivot pin portion positioned in proximity to said roof and said chamber and pivotally connected to said sidewalls, a rearward downwardly sloping locking finger cantilevered and extending rearwardly of said pivot pin portion, said locking finger having a downwardly hooked portion and being movable from a downward locked position for lockably engaging said latch-receiving opening of the telephone handset to an upward unlocked open position spaced from said telephone handset, a manually depressible downwardly sloping front finger cantilevered and extending forwardly of said pivot pin portion for pivoting said locking finger to said upward unlocked open position, said front finger having an upwardly facing finger-engaging button portion aligned in registration below said U-shaped finger-receiving opening of said roof, and a spring wedged between and engaging said roof and said locking finger for urging said locking finger in said locked position; and an interchangeable reversible side mounting plate attached to one of said sidewalls, said mounting plate having a front face and a side face, said side face having a pair of substantially U-shaped slotted portions with substantially U-shaped bracket-engaging teeth;

a reversible side mounting bracket having a bifurcated pair of substantially U-shaped channel support members aligned in vertical registration for slidably engaging said U-shaped slotted portions and said teeth, each of said channel support members having a substantial horizontal slide bar-receiving slot, said mounting bracket having an intermediate bight section for positioning substantially parallel to said mounting plate, and an elongated substantially planar perforated lateral plate member extending laterally and substantially transverse to said mounting plate for attachment to a a seat or a chair; and a locking safety slide bar slidably extending into said mounting plate for releasably locking and securing said U-shaped channel support members of said bracket to said bracket-engaging teeth, said slide bar having an elongated slidable portion and a manually grippable front abutment portion providing a handle extending laterally from said slidable portion, and said slide bar being moveable from a forward open position extending forwardly of said mounting plate for removal of said bracket to a rearward closed position with said front abutment portion substantially flush against the front face of said mounting plate and said slidable portion extending through one of said slide bar-receiving slots of said support channels members for securely locking said bracket to said mounting plate.

17. A telephone handset holder assembly, comprising:

a module comprising a substantially rectangular housing having end walls including a top wall providing a roof and a bottom wall providing a floor, said end walls having substantially parallel exterior surfaces, said floor defining a cord-receiving slot, said top wall having a substantially U-shaped finger-receiving opening said housing having an upright back wall extending downwardly from said top wall and substantially parallel sidewalls connected to said back wall and said top wall;

said housing defining a front access handset-opening and telephone handset-receiving compartment comprising an internal chamber communicating with said access opening for receiving a telephone handset, said chamber being substantially complementary to said telephone handset;

said floor having a substantially triangular section extending upwardly into said chamber, said triangular section having a rounded apex and an inclined front ramp sloping downwardly and communicating with said front access opening for enhancing egress and gravity discharge of said telephone handset from said chamber through said front access opening, said floor having a front abutment lip extending upwardly from said front ramp, and said lip having a slot aligned in registration communicating with said cord-receiving slot;

said back wall having an inwardly facing back wall-surface comprising a central intermediate portion;

a locking assembly for locking said telephone handset in said chamber, said locking assembly comprising a pivot pin portion positioned in proximity to said roof and said chamber and pivotally connected to said sidewalls, a rearwardly downwardly sloping locking finger cantilevered and extending rearwardly of said pivot pin portion, said locking finger having a downwardly hooked portion and being moveable from a downward locked position for lockably engaging a card-receiving and lock-engaging slot of the telephone handset to an upward unlocked open position spaced from said telephone handset, a manually depressible downwardly sloping front finger cantilevered and extending forwardly of said pivot pin portion for pivoting said locking finger to said upward unlocked open position, said front finger having an upwardly facing finger-engaging button portion aligned in registration below said U-shaped finger-receiving opening of said roof, and a spring wedged between and engaging said roof and said locking finger for urging said locking finger in said locked position;

a mounting plate attached to one of said sidewalls, said mounting plate having a front face and a side face, said side face having a pair of substantially U-shaped slotted portions with substantially U-shaped bracket-engaging teeth;

a bracket having a bifurcated pair of substantially U-shaped channel support members aligned in vertical registration for slidably engaging said U-shaped slotted portions and said teeth, each of said channel support members having a substantial horizontal slide bar-receiving slot, said bracket having an intermediate bight section for positioning substantially parallel to said mounting plate, and an elongated substantially planar perforated lateral plate member extending laterally and substantially transverse to said mounting plate for attachment to a seat or chair; and a locking safety slide bar slidably extending into said mounting plate for releasably locking and securing said U-shaped channel support members of said bracket to said bracket-engaging teeth, said slide bar having an elongated slidable portion and a manually grippable front abutment portion providing a handle extending laterally from said slidable portion, and said slide bar being moveable from a forward open position extending forwardly of said mounting plate for removal of said bracket to a rearward closed position with said front abutment portion substantially flush against the front face of said mounting plate and said slidable portion extending through one of said slide bar-receiving slots of said support channels members for securely locking said bracket to said mounting plate.

18. A telephone handset and holder assembly, comprising:

a universal telephone and computer control handset, having
substantially planar imperforate sidewalls including a left sidewall and a right sidewall, said sidewalls being substantially parallel and rectangular with rounded corners;
substantially planar and parallel end walls extending transversely between and connecting said sidewalls, said end walls including a substantially imperforate top wall providing a top and a bottom wall providing a bottom, said end walls being substantially rectangular with rounded corners, and said bottom wall defining a cord-receiving opening in proximity to one of said said sidewalls and providing a socket;
a back surface providing a back extending between and connecting said end walls and said sidewalls, said back surface having a substantially planar back portion and being substantially rectangular with rounded corners, and said back having an array of finger engageable keys;
a front surface providing a front extending between and connecting said end walls and said sidewalls, said front surface having substantially planar front portions positioned substantially parallel to said planar back portions of said back, said front having an earpiece adjacent said top, a mouthpiece in proximity to said bottom, an intermediate control section positioned between said earpiece and said mouthpiece, said intermediate control section having a set of telephone activating control keys facing opposite said finger engageable keys, and said front defining a substantially vertical elongated card-receiving slot extending through said end walls, said slot being substantially parallel and disposed adjacent another one of said sidewalls, said slot having an enlarged card-receiving inlet opening providing a mouth comprising a latch-receiving opening with a substantially triangular lower section and a substantially rectangular upper section, said mouth having a substantially straight outer side disposed substantially contiguous to said slot along said adjacent sidewall, an upright inner side along said upper section positioned substantially parallel to said outer side, and a tapered angled side providing a cam surface along said lower section diverging inwardly and upwardly;
said telephone activating control keys comprising manually engagable keys providing finger engaging controls selected from the group consisting of resilient depressible key pads and pushbuttons;
said earpiece comprising a raised earpiece extending forwardly of said planar front portions, said raised earpiece having a substantially rectangular periphery as viewed from the front with rounded corner, said earpiece having a substantially planar sloping portion extending upwardly away from said mouthpiece at an angle of inclination ranging from about 15 degrees to about 75 degrees with a substantially circular earpiece portion defining a series of apertures providing ear holes surrounded by said rectangular periphery, and said raised earpiece having an inverted U-shaped top portion positioned flush and in substantial coplanar relationship with said top wall and having rounded corners; and said mouthpiece comprising a recessed mouthpiece with triangular upright sides and having an inclined ramped portion providing a ramp extending between and connecting said triangular sides, and said ramp sloping downwardly and away from said earpiece towards said bottom at an angle of inclination ranging from about 15 degrees to about 75 degrees and defining upright slits providing mouthpiece holes; and a handset holder assembly for storing and holding said telephone handset, said handset holder assembly comprising a handset holder including a module comprising a substantially rectangular housing, said housing having end walls including a top wall providing a roof and a bottom wall providing a floor, said end walls having substantially parallel exterior surfaces, said floor defining a cord-receiving slot, said top wall having a substantially U-shaped finger-receiving opening said housing having an upright back wall extending downwardly from said top wall and substantially parallel sidewalls connected to said back wall and said top wall;

said housing defining a front access handset-opening and telephone handset-receiving compartment comprising an internal chamber communicating with said access opening for receiving a telephone handset, said chamber being substantially complementary to said telephone handset;

said floor having a substantially triangular section extending upwardly into said chamber, said triangular section having a rounded apex and an inclined front ramp sloping downwardly and communicating with said front access opening for enhancing egress and gravity discharge of said telephone handset from said chamber through said front access opening, said floor having a front abutment lip extending upwardly from said front ramp, and said lip having a slot aligned in registration communicating with said cord-receiving slot;

said back wall having an inwardly facing back wall-surface comprising a central intermediate portion;

a locking assembly for locking said telephone handset in said chamber, said locking assembly comprising a pivot pin portion positioned in proximity to said roof and said chamber and pivotally connected to said sidewalls, a rearward downwardly sloping locking finger cantilevered and extending rearwardly of said pivot pin portion, said locking finger having a downwardly hooked portion and being moveable from a downward locked position for lockably engaging said latch-receiving opening of said telephone handset to an upward unlocked open position spaced from said telephone handset, a manually depressible downwardly sloping front finger cantilevered and extending forwardly of said pivot pin portion for pivoting said locking finger to said upward unlocked open position, said front finger having an upwardly facing finger-engaging button portion aligned in registration below said U-shaped finger-receiving opening of said roof, and a spring wedged between and engaging said roof and said locking finger for urging said locking finger in said locking position;

a mounting plate attached to one of said side-walls, said mounting plate having a front face and a side face, said side face having a pair of substantially U-shaped slotted portions with substantially U-shaped bracket-engaging teeth;

a bracket having a bifurcated pair of substantially U-shaped channel support members aligned in vertical registration for slidably engaging said U-shaped slotted portions and said teeth, each of said channel support members having a substantial horizontal slide bar-receiving slot, said bracket having an intermediate bight section for positioning substantially parallel to said mounting plate, and an elongated substantially planar perforated lateral plate member extending laterally and substantially transverse to said mounting plate for attachment to a seat or a chair; and a locking safety slide bar slidably extending into said mounting plate for releasably locking and securing said U-shaped channel support members of said bracket to said bracket-engaging teeth, said slide bar having an elongated slidable portion and a manually grippable front abutment portion providing a handle extending laterally from said slidable portion, and said slide bar being moveable from a forward open position extending forwardly of said mounting plate for removal of said bracket to a rearward closed position with said front abutment portion substantially flush against the front face of said mounting plate and said slidable portion extending through one of said slide bar-receiving slots of said support channels members for securely locking said bracket to said mounting plate.

* * * * *